(12) United States Patent
Kim et al.

(10) Patent No.: US 7,861,436 B2
(45) Date of Patent: Jan. 4, 2011

(54) LAUNDRY TREATING MACHINE AND METHOD FOR CONTROLLING THE SAME

(75) Inventors: Joo Yeon Kim, Changwon-Si (KR); Kyung Ah Choi, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 274 days.

(21) Appl. No.: 12/137,269

(22) Filed: Jun. 11, 2008

(65) Prior Publication Data

US 2009/0113741 A1      May 7, 2009

(30) Foreign Application Priority Data

Jun. 13, 2007   (KR) .................... 10-2007-0057916

(51) Int. Cl.
*F26B 19/00*   (2006.01)
*F26B 25/06*   (2006.01)
*F26B 25/08*   (2006.01)

(52) U.S. Cl. ............................. 34/202; 34/218; 34/239; 34/93

(58) Field of Classification Search .................... 34/93, 34/522, 526, 202, 218, 239
See application file for complete search history.

(56) References Cited

U.S. PATENT DOCUMENTS

| | | | | |
|---|---|---|---|---|
| 4,419,982 A | * | 12/1983 | Eckels | 126/625 |
| 4,682,424 A | * | 7/1987 | Irving | 34/202 |
| 5,622,639 A | * | 4/1997 | Kitayama et al. | 219/390 |
| 6,185,834 B1 | * | 2/2001 | Yang | 34/58 |

FOREIGN PATENT DOCUMENTS

JP                05115687 A   *   5/1993

* cited by examiner

*Primary Examiner*—Jiping Lu
(74) *Attorney, Agent, or Firm*—Ked & Associates LLP (57) ABSTRACT

A laundry treating machine is disclosed. The laundry treating machine includes a case having a laundry receiving space for receiving laundry defined therein, the case being located above another laundry treating machine, a hot air supply unit for supplying hot air into the laundry receiving space, a manipulation part for allowing a user to select a drive course, a control unit for controlling the hot air supply unit to be driven according to the course selected by the manipulation part, and a guide unit for assisting the user to put the laundry in the laundry receiving space.

21 Claims, 7 Drawing Sheets

LAUNDRY TREATING MACHINE AND METHOD FOR CONTROLLING THE SAME

CROSS-REFERENCE TO RELATED APPLICATION

This application claims the benefit of Korean Patent Application No. 10-2007-57916, filed on Jun. 13, 2007, which is hereby incorporated by reference in its entirety as if fully set forth herein.

BACKGROUND OF THE INVENTION

1. Field of the Invention

The present invention relates to a laundry treating machine and a method for controlling the same, and more particularly, to a laundry treating machine that can be installed above another laundry treating machine while the laundry treating machines are spaced a predetermined distance from each other and a method for controlling the same.

2. Discussion of the Related Art

Generally, laundry is naturally dried outdoors or is forcibly dried by a laundry drying machine to remove moisture from the laundry after the laundry is washed.

Laundry is usually dried outdoors in relative sunny and clear weather, whereas a laundry drying machine is usually used to dry laundry when humidity is high and the weather is cloudy.

Based on how to heat air, i.e., kinds of a heater to heat air, a laundry drying machine may be classified as an electric laundry drying machine or a gas laundry drying machine. The electric laundry drying machine heats air using electric resistance heat, whereas the gas laundry drying machine heats air using heat generated by the combustion of gas.

Meanwhile, a washing machine with a laundry drying function generally performs a laundry drying operation using an electric heater. In such a laundry treating machine, such as the above-described laundry drying machine, only artificial resources, such as electricity or gas, are used to dry laundry.

In recent years, dwelling culture has been formed to realize a wider and more comfortable life even in the same space with the improvement in quality of life. And yet, the conventional laundry drying machine is generally installed on an outdoor or indoor floor.

The conventional laundry drying machine described above has the following problems.

First, when a washing machine with no laundry drying function is used, it is required to use an additional laundry drying machine to dry laundry. However, it is difficult to install a laundry treating machine, including the additional laundry drying machine, in a small space, such as a small room.

Second, energy efficiency lowers when laundry is dried only by the laundry treating machine, such as the laundry drying machine, without using natural light, in sunny and clear weather.

SUMMARY OF THE INVENTION

Accordingly, the present invention is directed to a laundry treating machine and a method for controlling the same that substantially obviate one or more problems due to limitations and disadvantages of the related art.

An object of the present invention is to provide a laundry treating machine that can be installed and used in a small space and a method for controlling the same.

Another object of the present invention is to provide a laundry treating machine that is capable of drying laundry using natural light, whereby energy efficiency of the laundry treating machine is improved, and a method for controlling the same.

A further object of the present invention is to provide a laundry treating machine that is capable of drying laundry based on external weather information or laundry information and a method for controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laundry treating machine includes a case having a laundry receiving space for receiving laundry defined therein, the case being located above another laundry treating machine, a hot air supply unit for supplying hot air into the laundry receiving space, a manipulation part for allowing a user to select a drive course, a control unit for controlling the hot air supply unit to be driven according to the course selected by the manipulation part, and a guide unit for assisting the user to put the laundry in the laundry receiving space.

Preferably, the guide unit includes an elevating unit that can be moved upward and downward through an open bottom of the case, and the elevating unit is controlled by the control unit.

Preferably, when the elevating unit is moved upward, the open bottom of the case is closed by the elevating unit.

Preferably, the elevating unit includes a hanger on which the laundry is hanged.

Preferably, the hanger is mounted in the elevating unit such that the hanger can be rotated at a predetermined angle.

Preferably, the guide unit includes a hanger mounted to the inside of the case such that the hanger can be rotated at a predetermined angle.

Preferably, the hanger is rotated under the control of the control unit.

Preferably, the laundry treating machine further includes a light collecting window mounted at least one side of the case for allowing natural light to be incident into the laundry receiving space therethrough.

Preferably, the laundry treating machine further includes a cover for opening and closing the light collecting window.

Preferably, the laundry treating machine further includes a first sensor for detecting whether natural light is incident through the light collecting window, and the user selects the drive course according to the detection result of the first sensor.

Preferably, the laundry treating machine further includes a first sensor for detecting whether natural light is incident through the light collecting window, and the control unit controls the hot air supply unit to be driven according to the detection result of the first sensor.

Preferably, the control unit adjusts the ratio of hot air drying time for which the laundry is dried by the hot air supply unit to natural light drying time for which the laundry is dried by the natural light, in the total drying time according to the selected course.

Preferably, the sum of the hot air drying time for which the laundry is dried by the hot air supply unit and the natural light drying time for which the laundry is dried by the natural light is equal to or greater than the total drying time.

Preferably, the laundry treating machine further includes an identification tag attached to the laundry, the identification tag containing laundry information, and a second sensor mounted in the case for identifying the laundry information from the identification tag.

Preferably, the control unit receives the laundry information from the second sensor to control the operation of the hot air supply unit.

Preferably, the control unit controls the laundry information received from the second sensor to be displayed on a display unit such that the operation of the hot air supply unit is controlled by the user's input.

Preferably, the control unit includes an operation mode storage unit in which operation information of the laundry treating machine is previously inputted, and the control unit selects operation information corresponding to the selected course and the received laundry information to perform the drying operation.

Preferably, the operation time or the temperature of the hot air supply unit is controlled based on the kind of laundry among the laundry information.

Preferably, the laundry treating machine further includes a communication module for receiving weather information from the outside and transmitting the received weather information to the control unit.

Preferably, the control unit controls the hot air supply unit to be driven according to the weather information and the laundry information.

Preferably, the control unit controls the weather information to be displayed on a display unit such that the operation of the hot air supply unit is controlled by the user's input.

Preferably, the weather information include at least one selected from a group consisting of temperature, humidity, the velocity of wind, the direction of wind, whether or not yellow sand exists, an ultraviolet index, a typhoon, the amount of rainfall, and the amount of snowfall.

Preferably, the laundry treating machine further includes an ultraviolet lamp mounted at the case for sterilizing the laundry.

Preferably, the control unit receives the laundry information from the second sensor to control the operation of the ultraviolet lamp.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
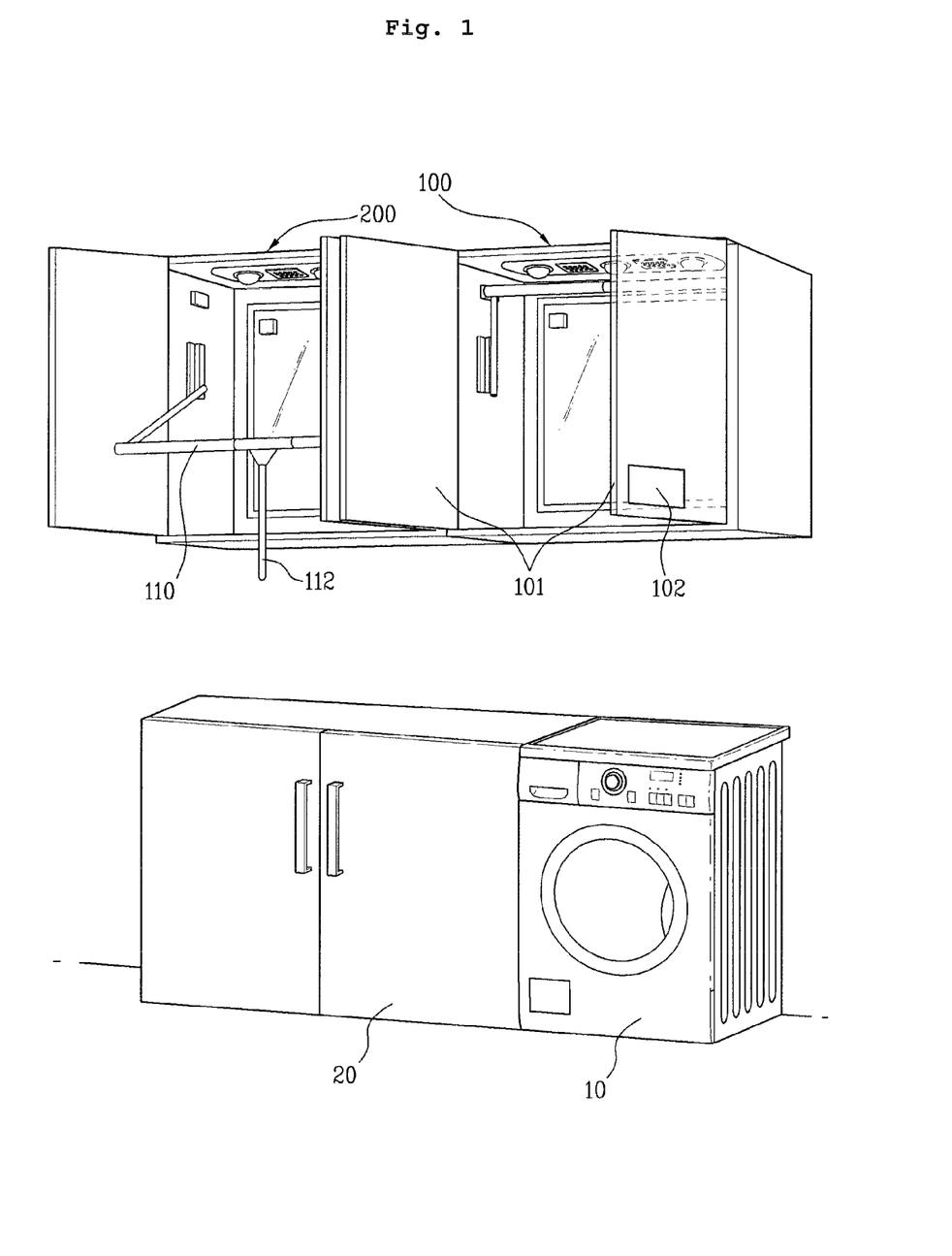
FIG. 1 is a perspective view illustrating the installed states of laundry treating machines according to embodiments of the present invention.

FIG. 1 is a perspective view illustrating the installed states of laundry treating machines 100 and 200 according to two different embodiments of the present invention. That is, FIG. 1 illustrates the laundry treating machines 100 and 200 being installed in predetermined different spaces.

Referring to FIG. 1, the laundry treating machines 100 and 200 according to the respective embodiments of the present invention may be installed above a washing machine or a spin-drying machine 10 and a laundry storage cabinet 20 such that the laundry treating machines 100 and 200 are spaced a predetermined distance from the washing machine or the spin-drying machine 10 and the laundry storage cabinet 20.

Specifically, the laundry treating machines 100 and 200 according to the respective embodiments of the present invention are not supported on a floor in a predetermined space but are mounted to the sidewall of a building, thereby maximizing spatial utilization. Consequently, it is possible that the washing machine 10 is installed at the lower part of an installation space, and the laundry treating machines 100 and 200 according to the respective embodiments of the present invention are installed at the upper part of the installation space, even though the installation space is small.

When the washing machine is located below the laundry treating machines 100 and 200 as described above, it is not necessary for a user to move laundry washed by the washing machine to a drying machine remote from the washing machine to dry the laundry, but it is possible that the washed laundry is dried by the laundry treating machines 100 and 200 located above the washing machine, which is very convenient for the user.

Hereinafter, a laundry treating machine 100 according to a first embodiment of the present invention will be described in detail.

Figure 2:
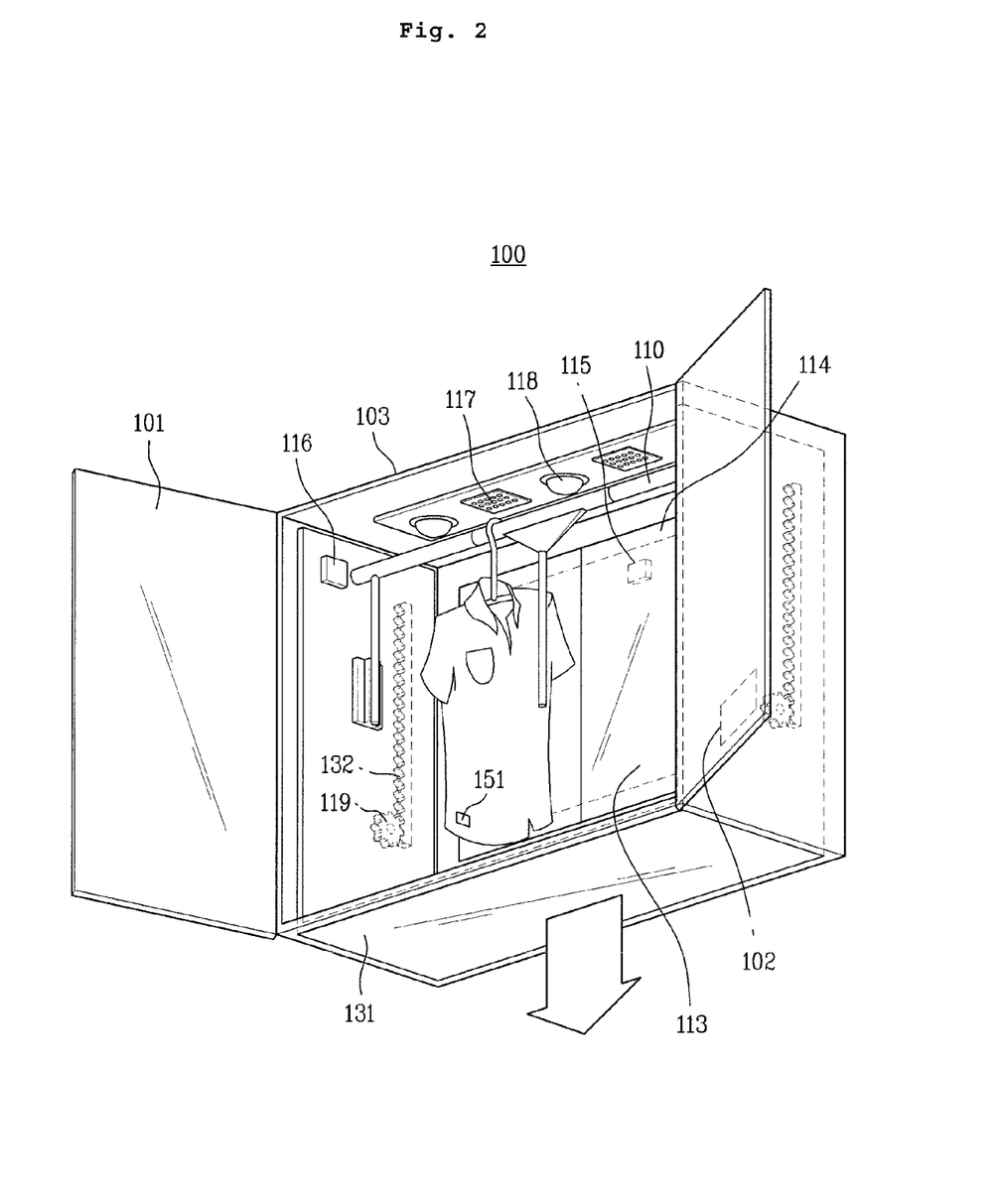
FIG. 2 is a perspective view illustrating a laundry treating machine according to a first embodiment of the present invention.

FIG. 2 is a perspective view illustrating a laundry treating machine 100 according to a first embodiment of the present invention.

Referring to FIG. 2, the laundry treating machine 100 according to the first embodiment of the present invention includes a case 103 forming the external appearance of the laundry treating machine 100, a hot air supply unit 117 for supplying hot air into the case 103, and a control unit (not shown) for controlling the operation of the hot air supply unit 117.

The case 103 forms the external appearance of the laundry treating machine 100. In the case 103 are mounted various components constituting the laundry treating machine 100. Specifically, the case 103 has a laundry receiving space defined therein. The laundry receiving space may be exposed to the outside by a door 101 which may be provided at the front of the case 103. Also, a hanger 110 may be mounted in the laundry receiving space of the case 103 such that laundry is hanged by the hanger 110.

The door 101 may be mounted at one side of the case 103 such that the door 101 can be hingedly rotated. In the first embodiment of the present invention, the door 101 is constructed in a two-door type structure. However, the door 101 may be constructed in a one-door type structure in which the door 101 is opened only in one direction. The hanger 110 may be mounted at the upper part in the case 103 such that laundry is hanged by the hanger 110.

Meanwhile, the hot air supply unit 117 may supply hot air to laundry received in the case 103. The hot air supply unit 117 may include a blowing fan (not shown) for blowing air and a heater (not shown) for heating the air. According to circumstances, a plurality of the hot air supply units 117 may be mounted in the case 103.

In the case 103 may be mounted an elevating unit 131 that can be moved upward and downward through an open bottom of the case 103. FIG. 2 illustrates a state in which the elevating unit 131 is received in the case 103, whereas FIG. 3 illustrates another state in which the elevating unit 131 is moved downward.

Figure 3:
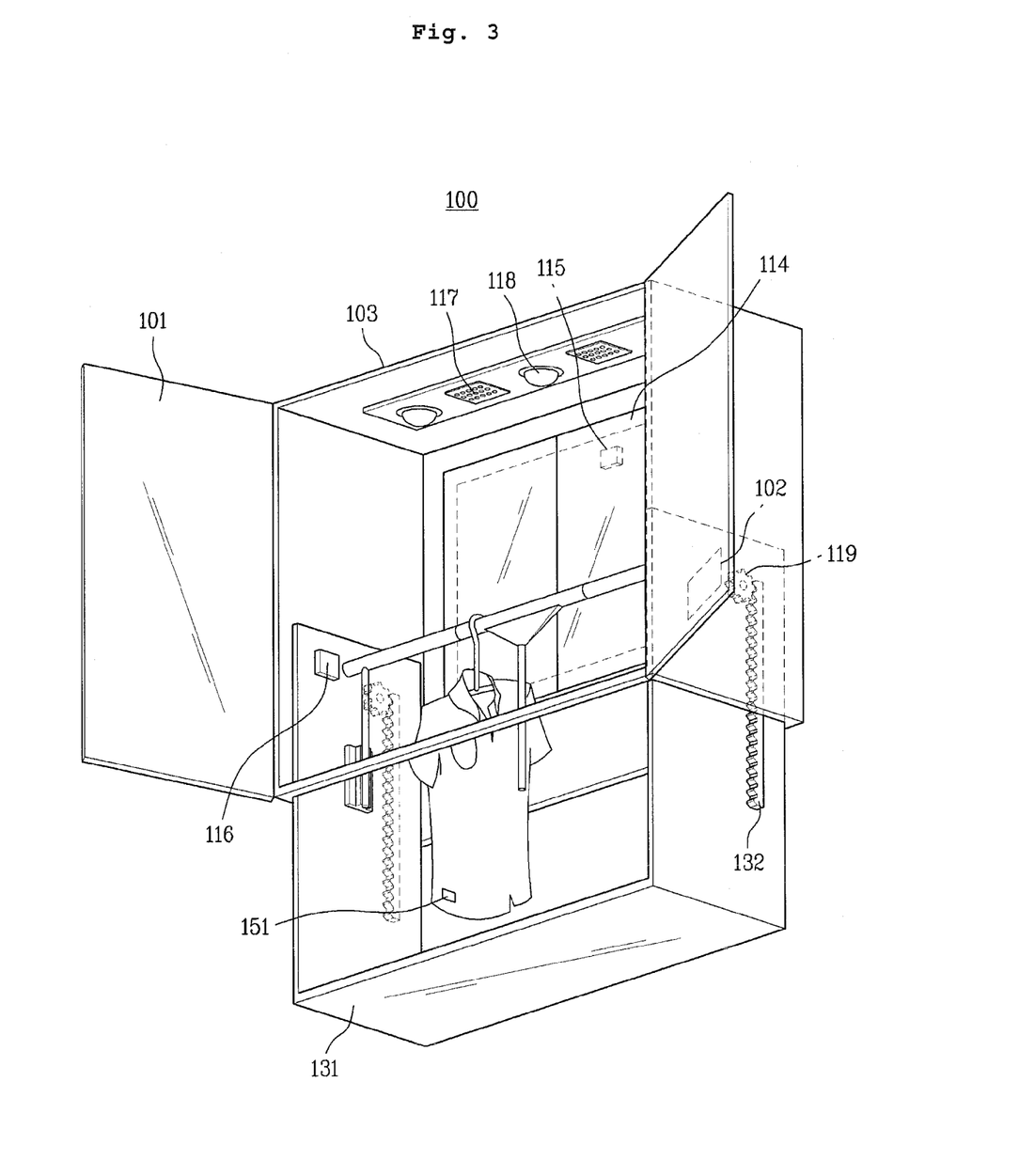
FIG. 3 is a perspective view illustrating the lowered state of an elevating unit of FIG. 2.

Referring to FIGS. 2 and 3, the elevating unit 131 may be formed approximately in the shape of 'U' when viewed from the front. That is, opposite sides of the elevating unit 131 may correspond to opposite insides of the case 103. In this case, the hanger 110 may be mounted across the elevating unit 131.

The structure for moving the elevating unit 131 upward and downward may be variously implemented. For example, rack gears 132 may be mounted at opposite outsides of the elevating unit 131, respectively, and pinion gears 119 may be mounted at opposite insides of the case 103, respectively, such that the pinion gears 119 engage with the respective rack gears 132. In this case, the pinion gears 119 may be rotated by a motor mounted at one side of the case 103. Consequently, when the pinion gears 110 are rotated in the forward direction or in the reverse direction, the rack gears 132, engaged with the respective pinion gears 110, are moved in a straight line, with the result that the elevating unit 131 is moved upward or downward. The above-described structure for moving the elevating unit 131 upward and downward is one possible example, and therefore, this embodiment of the present invention is not limited by the above-described structure for moving the elevating unit 131 upward and downward.

Meanwhile, the bottom of the case 103 is open, and therefore, the elevating unit 131 can be moved upward and downward through the open bottom of the case 103. Consequently, when the elevating unit 131 is moved upward, with the result that the elevating unit 131 is fully inserted into the case 103, as shown in FIG. 2, the bottom of the elevating unit 131 closes the open bottom of the case 103, with the result that the interior of the laundry treating machine 100 is hermetically sealed.

As previously described, the laundry treating machine 100 according to the first embodiment of the present invention is located above the washing machine 10, i.e., at a relatively high position. As a result, short person's hands may not reach the hanger 110, when using the laundry treating machine 100, with the result that it may be very inconvenient for the short person to hang laundry on the hanger 110. For this reason, as shown in FIG. 3, the elevating unit 131 is constructed in a structure in which the elevating unit 131 can be moved upward and downward such that the short person moves the elevating unit 131 downward until hands of the short person reach the hanger 110, hangs laundry on the hanger 110, and moves the elevating unit 131 upward.

Referring back to FIGS. 2 and 3, a display unit 102 may be mounted at the front of the case 103 for displaying the interior state of the case 103 and the operational state of the hot air supply unit 117. The display unit 102 may be mounted at one side of the door 101. Also, the display unit 102 may include a manipulation part 161 (see FIG. 6) for allowing a user to input a drive command for driving the laundry treating machine 100.

The display unit 102 may display the interior state of the case 103, e.g., the interior temperature and humidity of the case 103, and information received from a first sensor 115 and a second sensor 116, which will be described below. Also, the display unit 102 may display whether or not the hot air supply unit 117 is being operated, the temperature of hot air, and the intensity of wind.

Meanwhile, the laundry treating machine 100 according to the first embodiment of the present invention may include a light collecting window mounted at least one side of the case 103 such that laundry can be dried by natural light incident into the case 103 through the light collecting window 113.

The light collecting window 113 may be located at any position of the case 103. Preferably, however, the light collecting window 113 is located at the rear of the case 103. When the light collecting window 113 is located at the rear of the case 103, the laundry treating machine 100 according to the first embodiment of the present invention may be installed at a position where external natural light can be incident into the laundry treating machine 100, e.g., a wall having a window. In this case, natural light, introduced through the window of the wall, may be incident into the laundry treating machine 100 through the light collecting window 113.

The light collecting window 113 may be made of a transparent material, such as glass or transparent plastic, which can transmit natural light. Of course, the light collecting window 113 may isolate the interior of the laundry treating machine 100 from the outside.

In the laundry treating machine 100 according to the first embodiment of the present invention, it is preferred that the light collecting window 113 transmit ultraviolet rays, since the ultraviolet rays introduced into the laundry treating machine 100 from the outside through the light collecting window 113 have a property to sterilize laundry.

Generally, ultraviolet rays are electromagnetic radiation having a wavelength shorter than that (400 nm) of visible rays but longer than that (100 nm) of X-rays. The ultraviolet rays have a short wavelength, and therefore, the transmissivity of the ultraviolet rays is low; however, the ultraviolet rays have strong energy, and therefore, the ultraviolet rays accelerate chemical reaction, oxidize organic matter, and sterilize microorganisms.

Meanwhile, the laundry treating machine 100 according to the first embodiment of the present invention may further include a cover 114 for controlling the opening degree of the light collecting window 113 to adjust the amount of natural light incident through the light collecting window 113. The cover 114 may be opened, for example, fully, in half, or the like. The structure for controlling the opening degree of the cover 114 may be variously implemented. For example, a motor may be mounted at one side of the case 103 where the light collecting window 113 is formed. The motor may be driven to open or close the cover 114 or to move the cover 114 in a blind-type structure.

Also, the case 103 may be provided with a first sensor 115 for detecting whether natural light is incident through the light collecting window 113 and a second sensor 116 for identifying laundry information on laundry received in the case 103. Correspondingly, an identification tag 151 containing laundry information may be attached to each laundry article. Also, an ultraviolet (UV) lamp 118 for sterilizing laundry may be mounted at one side of the case 103. According to circumstances, a plurality of the first sensors 115, a plurality of the second sensors 116, and a plurality of the ultraviolet (UV) lamps 118 may be mounted at the case 103.

The first sensor 115 may be mounted at one side of the light collecting window 113 for detecting whether natural light is incident through the light collecting window 113.

Also, the above-described identification tag 151 may contain laundry information. The laundry information may be identified by the second sensor 116. In this case, the laundry information may include kinds of laundry, such as jumpers, shirts, and pants, or kinds of laundry material, such as wool, flax, a woolen cloth, and a grass cloth. Also, the laundry information may include date at which laundry articles have been quite recently dried by the laundry treating machine 100, the size of laundry articles, cautions when drying laundry, owners of laundry articles, manufacturing date of laundry articles.

Hereinafter, a laundry treating machine 200 according to a second embodiment of the present invention will be described with reference to FIGS. 4 and 5. The laundry treating machine 200 according to the second embodiment of the present invention is different from the laundry treating machine 100 according to the first embodiment of the present invention in that a hanger 210 is hingedly rotatable. The laundry treating machine 200 according to a second embodiment of the present invention will be described below based on such difference.

Figure 4:
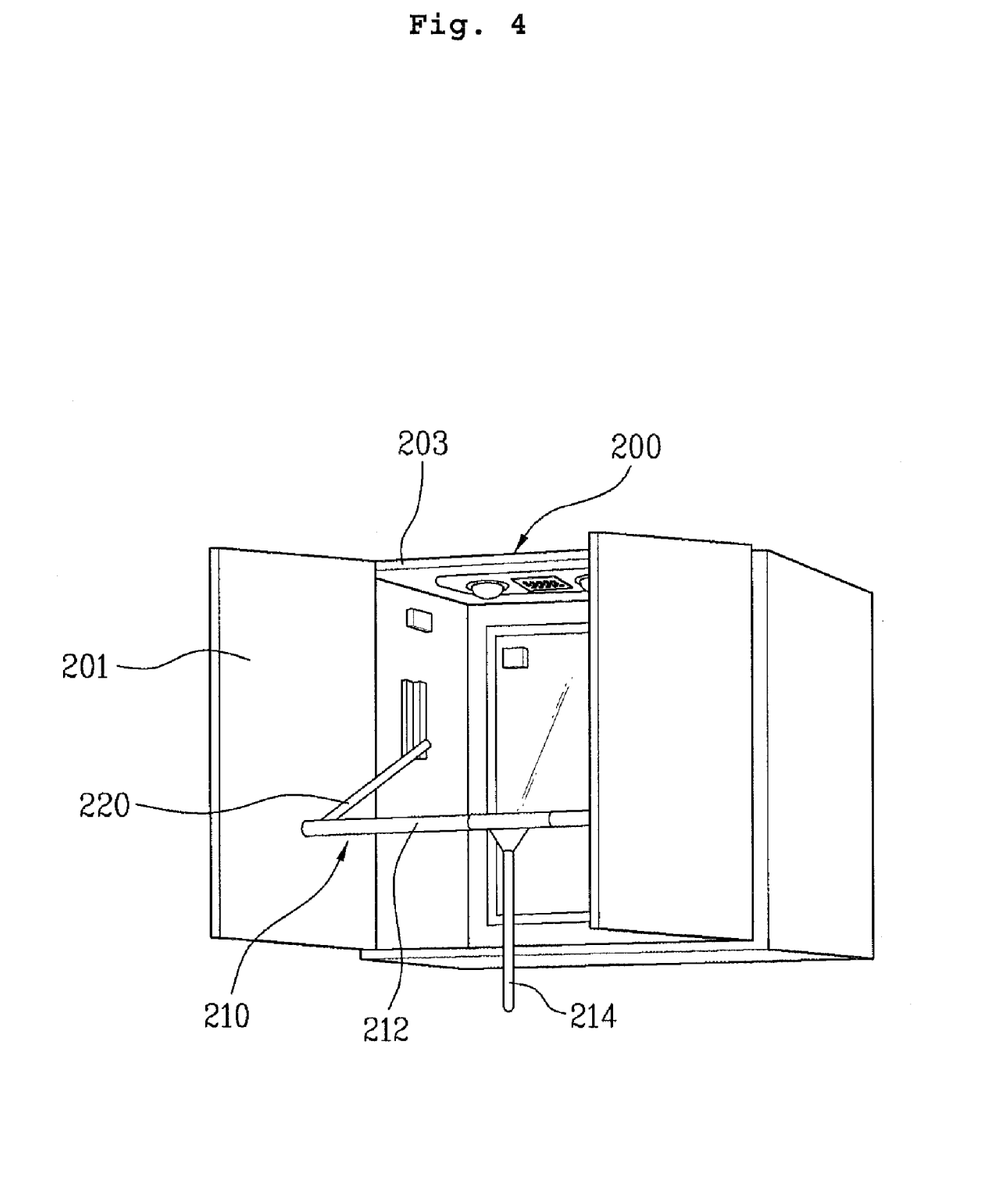
FIG. 4 is a perspective view illustrating a laundry treating machine according to a second embodiment of the present invention.
Figure 5:
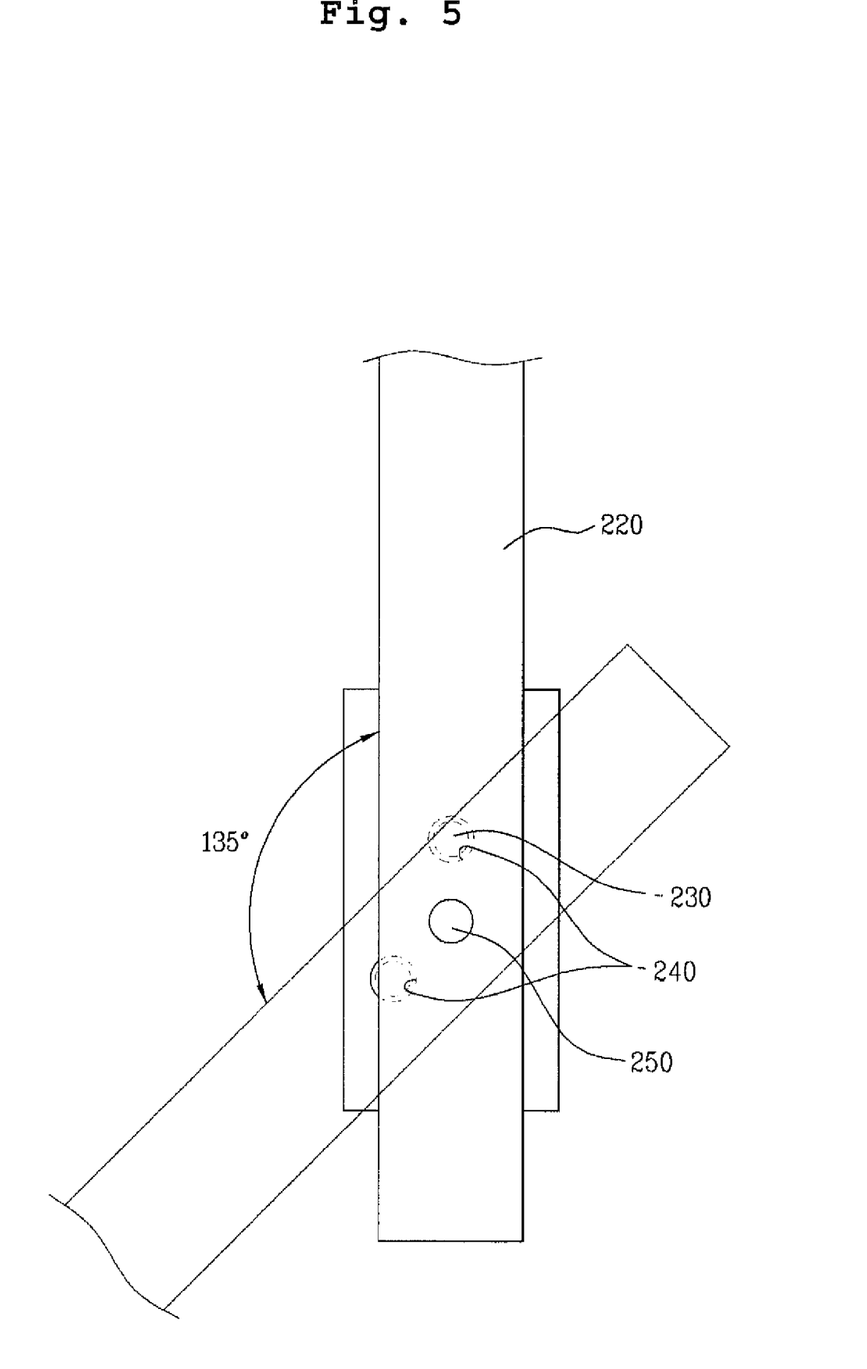
FIG. 5 is a partially enlarged side view of FIG. 4.

FIG. 4 is a perspective view illustrating a laundry treating machine 200 according to a second embodiment of the present invention, and FIG. 5 is an enlarged side view illustrating a hinge shaft of the hanger 210 of FIG. 4.

Referring to FIGS. 4 and 5, the laundry treating machine 200 according to the second embodiment of the present invention is characterized in that opposite ends of the hanger 210 are hingedly mounted at opposite insides of a case 203. Specifically, the hanger 210 may include a hanger body 212 on which laundry is hanged and hinged rotation members 220 extending from opposite ends of the hanger body 212 and connected to the opposite insides of the case 203 such that the hinged rotation members 220 can be hingedly rotated. Consequently, the hanger 210 can be hingedly rotated within a predetermined radius about hinge shafts connected to the case 203.

When the hanger 210 is hingedly rotated, the hanger body 212 of the hanger 210 is withdrawn out of the case 203. In this case, it is preferred that a door 201 be opened.

That is, when the hanger 210 is hingedly rotated downward, the hanger body 212 of the hanger 210 advances frontward. In this state, it is possible for a user to easily and conveniently hang laundry on the hanger 210. On the other hand, when the hanger 210 is hingedly rotated upward, the hanger body 212 of the hanger 210 retreats backward, with the result that the hanger 210 is received in the case 203.

Referring to FIG. 5, the hanger 210 is connected to the case 203 such that the hanger 210 can be hingedly rotated about the hinge shafts 250. In this case, the hingedly rotatable angle of the hinged rotation members 220 is not particularly restricted. In this embodiment, for example, each hinged rotation member 220 may have a hingedly rotatable angle of approximately 0 to 135 degrees.

Meanwhile, when the hanger 210 is located at the highest point within the hinged rotation range thereof and when the hanger 210 is located at the lowest point within the hinged rotation range thereof, the hanger 210 is preferably held.

To this end, holding grooves 240 are formed at each side of the case 203, and a protrusion 230 is formed at each hinged rotation member 220. That is, the holding grooves 240 are formed at the insides of the case 203 corresponding to the highest point and the lowest point of the hanger 210 within the hinged rotation range thereof. Consequently, when the hanger 210 is hingedly rotated to the highest point and the lowest point within the hinged rotation range thereof, the protrusions 230 of the hinged rotation members 220 are inserted into the corresponding holding grooves 240, with the result that the hanger 210 is held.

Also, a drive unit (not shown), including a motor, may be mounted at any one of the hinge shaft 250 of the hanger 210 for hingedly rotating the hanger 210. By the provision of the drive unit, it is possible to more stably hingedly rotate the hanger 210 to dry laundry when a large amount of laundry is hanged on the hanger 210.

Referring back to FIG. 4, a grip 214 may be further mounted at one side of the hanger 210 such that the grip 214 can be hingedly rotated about the hanger body 212. When a user wants to hang laundry on the hanger 210, the user may hingedly rotate the hanger 210 downward, while holding the grip 214, and hang the laundry on the hanger 210. After all the laundry is hanged on the hanger 210, the user may hingedly rotate the hanger 210 upward, while holding the grip 214, such that the hanger 210 is moved upward. After that, the user may close the door 201 of the case 203 and put the laundry treating machine 200 into operation to dry the laundry.

Meanwhile, the laundry treating machine 100 according to the first embodiment of the present invention and the laundry treating machine 200 according to the second embodiment of the present invention may be combined to implement a laundry treating machine according to a third embodiment of the present invention. As described above, the laundry treating machine 100 according to the first embodiment of the present invention includes the elevating unit that can be moved upward and downward, and laundry treating machine 200 according to the second embodiment of the present invention includes the hanger that can be hingedly rotated. Consequently, the laundry treating machine according to the third embodiment of the present invention may include both the elevating unit and the hingedly rotatable hanger. The elevating unit and the hingedly rotatable hanger of the laundry treating machine according to the third embodiment of the present invention are identical or similar to the corresponding ones of the laundry treating machines according to the first and second embodiments of the present invention, and a detailed description thereof will not be given.

Figure 6:
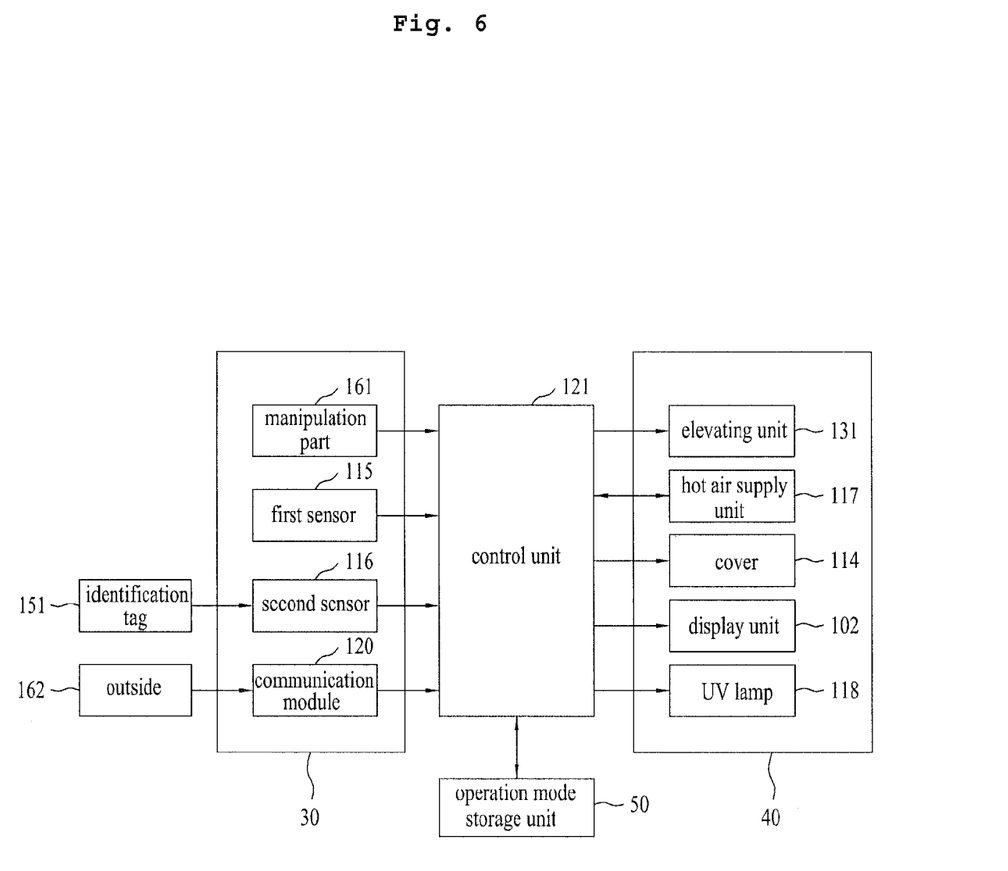
FIG. 6 is a block diagram illustrating the construction of the laundry treating machines according to the embodiments of the present invention.

FIG. 6 is a block diagram illustrating the construction of the laundry treating machines according to the embodiments of the present invention.

Referring to FIG. 6, the laundry treating machines according to the respective embodiments of the present invention may include an input unit 30 for inputting a command for driving the respective laundry treating machines or various kinds of information, a control unit 121 for receiving the command or information inputted from input unit 30 for controlling a drive unit 40, and the drive unit 40 configured to operate under the control of the control unit 121.

The input unit 30 may include a manipulation part 161 for allowing a user to input a drive command for driving the respective laundry treating machines, a first sensor 115 for detecting whether natural light is incident through the light collecting window 113, a second sensor 116 for identifying laundry information from an identification tag 151 attached to each laundry article, and a communication module 120 for receiving various kinds of information from the outside.

A user may manipulate the manipulation part 161 to input a command for driving each laundry treating machine. In this case, the manipulation part 161 may include a plurality of predetermined drive courses for driving each laundry treating machine. A drive course selected by the user is transmitted to the control unit 121, and the control unit 121 controls various drive units 40 according to the selected drive course, which will be described hereinafter in detail.

The first sensor 115 detects whether natural light is incident through the light collecting window 113. The sensed result is transmitted to the control unit 121. The second sensor 116 identifies laundry information from an identification tag 151 attached to each laundry article. The laundry information is also transmitted to the control unit 121.

The communication module 120 receives various kinds of information, e.g. weather information, from the outside 162. The received information is transmitted to the control unit 121. The weather information may include, for example, atmospheric temperature, the velocity of wind, the direction of wind, whether or not yellow sand exists, an ultraviolet index, a typhoon, the amount of rainfall, the amount of snowfall, etc. In FIG. 6, the outside 162 means an external server (not shown) connectable to the communication module 120 in a wire or wireless mode.

The control unit 121 controls the drive unit 40 according to the drive command for driving each laundry treating machine inputted from the input unit 30, whether or not natural light is incident, the laundry information, and the weather information.

The drive unit 40 may include the elevating unit 131 of each laundry treating machine, the hot air supply unit for supplying hot air, the cover 114 for opening and closing the light collecting window 113, the display unit 102 for displaying the state of each laundry treating machine, and the ultraviolet (UV) lamp 118 for irradiating ultraviolet rays.

The various components of the drive unit 40 are driven under the control of the control unit 121, which will be described hereinafter in detail.

Figure 7:
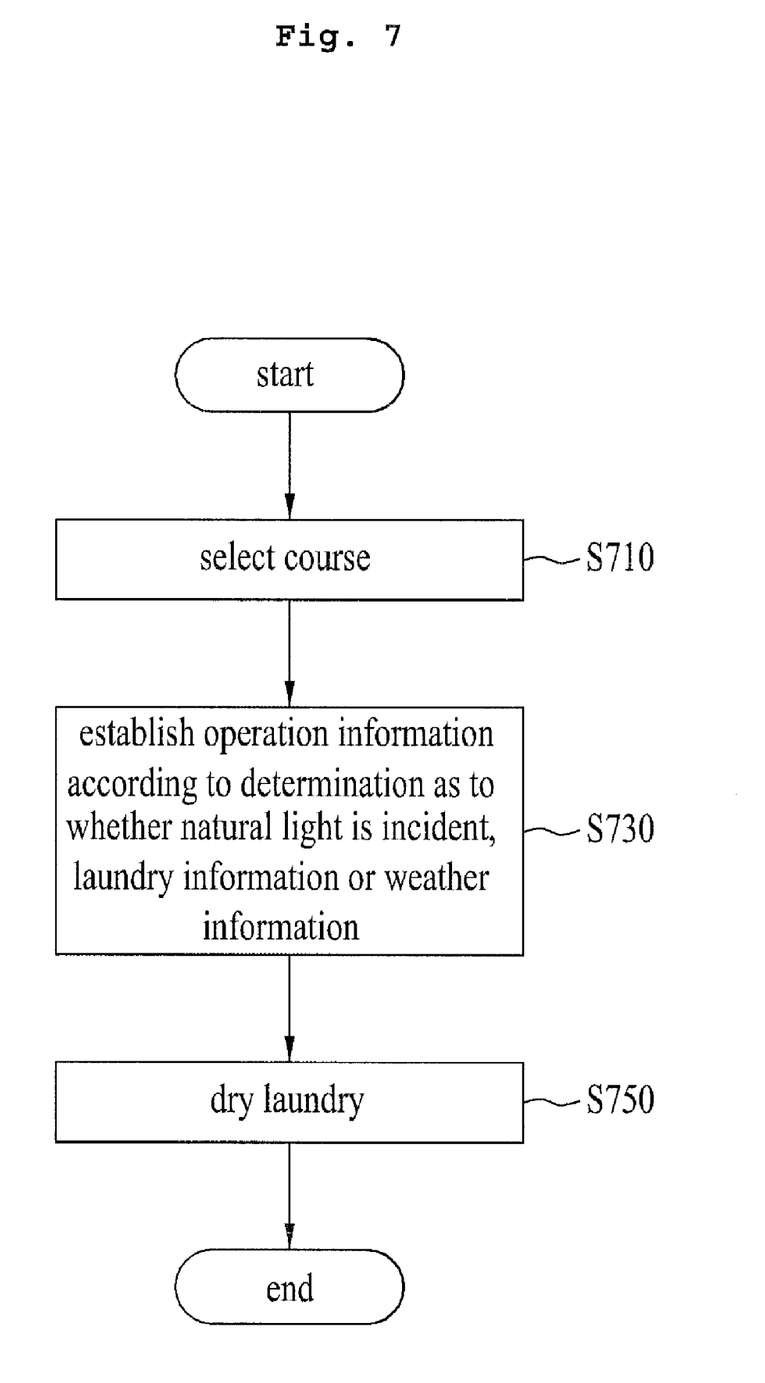
FIG. 7 is a flow chart illustrating a method for controlling a laundry treating machine according to an embodiment of the present invention.

FIG. 7 is a flow chart illustrating a method for controlling a laundry treating machine according to an embodiment of the present invention.

Referring to FIG. 7, a user puts laundry in the laundry treating machine and selects a drive course for driving the laundry treating machine (S710).

When the user puts the laundry in the laundry treating machine, he/she may lower the elevating unit 131 of the laundry treating machine to put the laundry in the laundry treating machine or hingedly rotate the hanger 210 downward to hang the laundry on the hanger 210. After the laundry is completely put in the laundry treating machine, the user selects the drive course for driving the laundry treating machine through the manipulation part 161.

In this case, the manipulation part 161 may include a plurality of predetermined drive courses, e.g., a normal laundry course, an underwear course, a luxury laundry course, etc. Meanwhile, operation information necessary to dry laundry using the hot air supply unit 117 or the ultraviolet (UV) lamp 118 for each drive course, e.g., information, such as approximate total drying time, approximate temperature of hot air supplied, approximate hot air supply time, or whether light is irradiated from the ultraviolet (UV) lamp 118, may be previously stored in the laundry treating machine, particularly in an operation mode storage unit 50 of the laundry treating machine. Consequently, the control unit 121 may read approximate operation information from the operation mode storage unit 50 according to the drive course selected by the user.

Subsequently, the control unit 121 receives various kinds of information from the first sensor 115, the second sensor 116, and the communication module 120 (S730).

Specifically, the control unit 121 receives information on whether natural light is incident into the laundry treating machine from the first sensor 115 and laundry information acquired by the detection of the identification tag 151 attached to each laundry article from the second sensor 116. Also, the control unit 121 receives various kinds of information, e.g., weather information, through the communication module 120.

The control unit controls the laundry to be dried based on the drive course selected by the user and the received information (S750).

Specifically, the control unit 121 reads total drying time, hot air supply temperature, and hot air supply time based on the drive course selected by the user from the operation mode storage unit 50, and uses the information received from the first sensor 115, the second sensor 116, and the communication module 120, to establish detailed operation information for the selected drive course.

First, the control unit 121 may adjust the ratio of hot air drying time for which the laundry is dried by the hot air supply unit 117 to natural light drying time for which the laundry is dried by the natural light, in the total drying time according to the course selected by the user depending upon the determination as to whether natural light is incident.

Specifically, when the total drying time according to the selected course is, for example, 6 hours, the control unit 121 may establish the ratio of the hot air drying time to the natural light drying time depending upon the laundry information, for example, such that the hot air drying time is 4 hours and the natural light drying time is 2 hours. In this case, the sum of the hot air drying time and the natural light drying time coincides with the total drying time according to the selected course.

Consequently, the control unit 121 controls the hot air supply unit 117 to supply hot air during the hot air drying process such that the laundry is dried by the hot air. In this case, the cover 114 may be closed such that natural light cannot be incident into the laundry treating machine. During the natural light drying process, the control unit 121 controls the hot air supply unit 117 to be stopped and controls the cover 114 to be opened such that the laundry can be dried by the natural light.

Meanwhile, the sequence of the hot air drying process and the natural light drying process may be appropriately controlled by the control unit 121. For example, when it is determined based on the information from the first sensor 115 that the amount of natural light incident is small at the beginning of the drying process, the control unit may perform a control operation such that the hot air drying process is first carried out. Also, when it is determined based on the weather information that the amount of natural light incident gradually decreases with the passage of time, the control unit may perform a control operation such that the natural light drying process is first carried out. Also, when it becomes cloudy or the amount of natural light incident decreases during the natural light drying process, the control unit may perform a control operation such that the natural light drying process is interrupted and the hot air drying process is carried out. The above-described examples of the control operations to control the hot air drying process and the natural light drying process are appropriately carried out by the control unit 121 of the laundry treating machine according to each embodiment of the present invention. However, the present invention is not limited to the above-described examples but the hot air drying process and the natural light drying process are appropriately controlled.

On the other hand, when the total drying time according to the selected course is, for example, 6 hours, the control unit 121 may establish the ratio of the hot air drying time to the natural light drying time depending upon the laundry information, for example, such that the hot air drying time is 4 hours and the natural light drying time is 4 hours. In this case, the sum of the hot air drying time and the natural light drying time is greater than the total drying time according to the selected course.

As a result, there exists a time zone in which the hot air drying time and the natural light drying time overlap with each other. That is, the sum of the hot air drying time and the natural light drying time is 8 hours, whereas the total drying time according to the selected course is 6 hours. Consequently, the natural light drying process and the hot air drying process may be simultaneously carried out for 2 hours corresponding to the difference between the sum of the hot air drying time and the natural light drying time and the total drying time according to the selected course. When the natural light drying process and the hot air drying process are simultaneously carried out, the control unit 121 controls the hot air supply unit 117 to operate, while controlling the cover 114 to be open, such that the laundry can be dried by both the natural light and the hot air.

Also, the control unit 121 may establish detailed operation information of the selected course using the laundry information received from the second sensor 116. That is, when approximate operation information is read from the operation mode storage unit depending upon the course selected by the user, it is possible to establish the operation information in detail based on the laundry information.

For example, when receiving laundry information indicating that the kind of laundry is knee pants, the size of the laundry is 32 inches, the material of the laundry is cotton, and the laundry must be dried at a temperature of 70° C. or less, the control unit 121 may establish detailed operation information using the laundry information as well as the approximate operation information based on the selected course. For example, the control unit 121 may establish operation information such that the interior temperature of the laundry treating machine does not exceed 70° C.

Meanwhile, the control unit 121 may control the laundry information received from the second sensor 116 to be displayed on the display unit 102. Based on the information displayed on the display unit 102, the user can confirm the laundry information and thus input a course through the manipulation part 161 based on the confirmed laundry information.

Also, the control unit 121 may control the laundry treating machine to be driven according to the weather information received through the communication module 120. For example, the control unit 121 may control the operation time or the temperature of the hot air supply unit 117 of the laundry treating machine based on the weather information. Also, the control unit 121 may control the opening degree of the cover 114 such that laundry can be dried by the natural light.

Also, the control unit 121 controls the weather information to be displayed on the display unit 102 such that the user can confirm the weather information and then select a course. Consequently, it is possible for the user to select an appropriate course based on the weather information. For example, when the weather information indicates that the direct rays of light are strong and the ultraviolet index is high, the user may select a course such that the cover 114 is closed to interrupt the incidence of natural light and laundry can be dried only by hot air if the laundry is damaged when the laundry is dried by the direct rays of light.

Also, the control unit 121 controls the operation of the ultraviolet (UV) lamp 118 based on the laundry information to sterilize laundry. For example, when receiving laundry information indicating that the kind of laundry is clothes for small children, clothes for patients, or clothes for allergic persons, the control unit 121 controls the operation time of the ultraviolet (UV) lamp 118 to be increased such that the sterilization of the laundry is strengthened.

As apparent from the above description, the laundry treating machine according to the present invention has the following effects.

First, it is possible to install and use the laundry treating machine in a relatively small space according to the present invention.

Second, it is possible to perform the drying process using natural light according to the present invention, thereby improving the energy efficiency of the laundry treating machine, and therefore, cutting down on electric charges.

Third, it is possible to dry laundry under optimum conditions based on external weather information or laundry information, thereby reducing a possibility of damage to laundry due to direct rays of light or high temperature at which laundry is deformed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A laundry treating machine, comprising:
 a case having a laundry receiving space for receiving laundry defined therein, the case being located above another laundry treating machine;
 a hot air supply to supply hot air into the laundry receiving space;
 a manipulator to allow for selection of a driving course corresponding to one or more conditions to be used to dry laundry in the laundry receiving space;
 a controller to control the hot air supply based on the driving course selected by the manipulation part; and
 an elevator to assist in placement of the laundry in the laundry receiving space, wherein:
 the elevator is moved upward and downward through an open bottom of the case,
 the elevator is controlled by the controller, and
 when the elevator is moved upward, the open bottom of the case is substantially closed by the elevator.

2. The laundry treating machine according to claim 1, wherein the elevator includes a hanger on which the laundry is hanged.

3. The laundry treating machine according to claim 2, wherein the hanger is mounted on the elevator to allow the hanger to be rotated at a predetermined angle.

4. The laundry treating machine according to claim 3, wherein the hanger is rotated under the control of the controller.

5. The laundry treating machine according to claim 1, further comprising: a light collecting window mounted at at least one side of the case that allows natural light to be incident on the laundry in the laundry receiving space.

6. The laundry treating machine according to claim 5, further comprising: a cover that opens and closes the light collecting window.

7. A laundry treating machine, comprising:
- a case having a laundry receiving space for receiving laundry defined therein, the case being located above another laundry treating machine;
- a hot air supply to supply hot air into the laundry receiving space;
- a manipulator to allow for selection of a driving course corresponding to one or more conditions to be used to dry laundry in the laundry receiving space;
- a controller to control the hot air supply based on the driving course selected by the manipulation part;
- an elevator to assist in placement of the laundry in the laundry receiving space;
- a light collecting window mounted at at least one side of the case that allows natural light to be incident on the laundry in the laundry receiving space;
- a cover that opens and closes the light collecting window; and
- a first sensor to detect whether the natural light is incident through the light collecting window, wherein the driving course is selected according to a detection result of the first sensor.

8. A laundry treating machine, comprising:
- a case having a laundry receiving space for receiving laundry defined therein, the case being located above another laundry treating machine;
- a hot air supply to supply hot air into the laundry receiving space;
- a manipulator to allow for selection of a driving course corresponding to one or more conditions to be used to dry laundry in the laundry receiving space;
- a controller to control the hot air supply based on the driving course selected by the manipulation part;
- an elevator to assist in placement of the laundry in the laundry receiving space;
- a light collecting window mounted at at least one side of the case that allows natural light to be incident on the laundry in the laundry receiving space;
- a cover that opens and closes the light collecting window; and
- a first sensor to detect whether the natural light is incident through the light collecting window, wherein the controller controls the hot air supply to be driven according to a detection result of the first sensor.

9. The laundry treating machine according to claim 8, wherein the controller adjusts a ratio of hot air drying time for which the laundry is dried by the hot air supply to natural light drying time for which the laundry is dried by the natural light, in total drying time according to the selected driving course.

10. The laundry treating machine according to claim 9, wherein a sum of the hot air drying time for which the laundry is dried by the hot air supply and the natural light drying time for which the laundry is dried by the natural light is substantially equal to or greater than the total drying time.

11. The laundry treating machine according to claim 8, further comprising:
- an identification tag attached to the laundry, the identification tag containing laundry information; and
- a second sensor, mounted in the case, to identify the laundry information from the identification tag.

12. The laundry treating machine according to claim 11, wherein the controller receives the laundry information from the second sensor to control an operation of the hot air supply.

13. The laundry treating machine according to claim 12, wherein the controller controls the laundry information received from the second sensor to be displayed on a display, to allow operation of the hot air supply to be controlled by a user's input.

14. The laundry treating machine according to claim 12, wherein the controller includes an operation mode storage device into which operation information of the laundry treating machine is previously inputted, and the controller selects the operation information corresponding to the selected driving course and the received laundry information to perform a drying operation.

15. The laundry treating machine according to claim 14, wherein an operation time or the temperature of the hot air supply is controlled based on a kind of laundry indicated by the laundry information.

16. The laundry treating machine according to claim 11, further comprising: a communication module to receive weather information from an external source and transmit the received weather information to the controller.

17. The laundry treating machine according to claim 16, wherein the controller controls the hot air supply to be driven according to the weather information and the laundry information.

18. The laundry treating machine according to claim 16, wherein the controller controls the weather information to be displayed on a display, to allow the hot air supply to be controlled based on a user's input.

19. The laundry treating machine according to claim 16, wherein the weather information includes at least one of temperature, humidity, velocity of wind, direction of wind, whether or not sand, dust, or pollen exists, an ultraviolet index, a typhoon, amount of rainfall, or amount of snowfall.

20. The laundry treating machine according to claim 11, further comprising: an ultraviolet lamp mounted at the case to sterilize the laundry.

21. The laundry treating machine according to claim 20, wherein the controller receives the laundry information from the second sensor to control operation of the ultraviolet lamp.

* * * * *